(12) United States Patent
Diao et al.

(10) Patent No.: US 6,888,704 B1
(45) Date of Patent: May 3, 2005

(54) METHOD AND SYSTEM FOR PROVIDING HIGH SENSITIVITY GIANT MAGNETORESISTIVE SENSORS

(75) Inventors: Zhitao Diao, Fremont, CA (US); Min Zhou, Fremont, CA (US); Lifan Chen, Fremont, CA (US); Wei Xiong, Fremont, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 80 days.

(21) Appl. No.: 10/349,470

(22) Filed: Jan. 22, 2003

(51) Int. Cl.$^7$ .............................................. G11B 5/39
(52) U.S. Cl. .......................... 360/324.1; 360/324.11; 360/324.12; 360/324.2
(58) Field of Search .................. 360/324.1, 324.2, 360/324.11, 324.12

(56) References Cited

U.S. PATENT DOCUMENTS

| | | | |
|---|---|---|---|
| 6,249,406 B1 * | 6/2001 | Gill et al. ............... | 360/324.11 |
| 6,381,106 B1 * | 4/2002 | Pinarbasi ............... | 360/324.12 |
| 6,614,630 B2 * | 9/2003 | Horng et al. .......... | 360/324.12 |
| 6,624,985 B1 * | 9/2003 | Freitag et al. ........... | 360/324.1 |
| 2003/0123201 A1 * | 7/2003 | Choe ..................... | 360/324.12 |

* cited by examiner

Primary Examiner—Mark Blouin
(74) Attorney, Agent, or Firm—Sawyer Law Group LLP

(57) ABSTRACT

A method and system for providing a magnetoresistive sensor and a read head that includes the magnetoresistive sensor is disclosed. The method and system include providing a pinned layer, a nonmagnetic spacer layer and a composite sensor layer. The pinned layer has a first magnetization that is pinned in a particular direction. The nonmagnetic spacer layer resides between the composite sensor layer and the pinned layer. The composite sensor layer includes a CoFe layer and a composite layer adjacent to the CoFe layer. The composite layer includes CoFe and at least one of Ta, Hf, Ti, Nb, Zr, Au, Ag, Cu, B, C, $O_2$, $H_2$ and $N_2$.

18 Claims, 4 Drawing Sheets

160

Rs Variation under -200 Oe at 200 C

170

DR/R Variation under -200 Oe at 200 C

METHOD AND SYSTEM FOR PROVIDING HIGH SENSITIVITY GIANT MAGNETORESISTIVE SENSORS

FIELD OF THE INVENTION

The present invention relates to magnetic recording systems, and more particularly to a method and system for providing a high sensitivity giant magnetoresistive sensor for high density recording applications.

BACKGROUND OF THE INVENTION

Currently in magnetic recording technology, magnetoresistive (MR) sensors are used in MR heads in order to read data from magnetic media. For higher density recording applications, the MR sensors are typically giant magnetoresistive ("GMR") sensors, such as spin valves.

FIG. 1 depicts a conventional MR sensor 10 that is typically used for reading data from a recording media (not shown). The conventional MR sensor 10 typically resides in a conventional read head that is incorporated into a conventional merged head that includes the conventional read head as well as a conventional writer. The conventional MR sensor 10 includes a conventional antiferromagnetic (AFM) layer 12, a conventional pinned layer 14, a conventional nonmagnetic spacer layer 16, a conventional CoFe sensor layer 18 and a conventional capping layer 20. The conventional capping layer 20 includes a conventional conductive layer 22 and a conventional capping layer.

The conventional pinned layer 14 and the conventional CoFe sensor layer 18 are ferromagnetic. The magnetization of the conventional pinned layer 14 is pinned in place by the conventional AFM layer 12. In certain conventional MR sensors (not shown) the conventional pinned layer 14 is a conventional synthetic pinned layer having two ferromagnetic layers that are antiferromagnetically coupled (AFC) and separated by a Ru layer. The magnetization of the conventional CoFe sensor layer 18 is free to rotate in response to an external magnetic field, such as one generated by the bits stored in a recording media. The conventional nonmagnetic spacer layer 16 is a conductive material, such as copper. In addition, CoFe/Cu interface is preferably surfactant treated by exposing the nonmagnetic spacer layer to oxygen. The conventional conductive layer 22 is typically composed of copper. The purpose of treating the nonmagnetic spacer layer 16 is to adjust the interlayer coupling between the conventional CoFe sensor layer 18 and the conventional pin layer 14 and to reduce the magnetostriction of the conventional CoFe sensor layer 18.

FIG. 2 depicts a conventional method 30 for fabricating the conventional MR sensor. The conventional AFM layer 12 is provided, via step 32. The conventional pinned layer 14 is then provided on the conventional AFM layer 12, via step 34. The conventional nonmagnetic spacer layer 16 is then fabricated, via step 36. The conventional CoFe sensor layer 18 is then provided, via step 38. The conventional capping layer 20, including the conventional conductive layer 22 and the conventional capping layer 24, are provided, via step 40.

Although the conventional MR sensor 10 formed using the conventional method 30 functions, one of ordinary skill with readily realize that as the thickness of the conventional CoFe sensor layer 18 is reduced, performance of the conventional MR sensor 10 degrades. For higher density recording applications, a sensor layer having a lower magnetization and, therefore, higher sensitivity to small magnetic fields is desired. As the thickness of the conventional CoFe sensor layer 18 decreases to less than or equal to approximately twenty Angstroms (particularly less than fifteen Angstroms), the magnetic properties of the conventional CoFe sensor layer 18 degrade. The coercivity of the conventional CoFe sensor layer 18 increases. In addition, the anisotropy field ($H_k$) increases. Because the conventional CoFe sensor layer 18 no longer has soft magnetic properties, the magnetization of the conventional CoFe sensor layer 18 does not readily change magnetic moment direction in response to an external field. In addition, the conventional CoFe sensor layer 18 may have very large magnetostriction. The dynamic range of the conventional MR sensor 10 is reduced and it becomes difficult to control the bias point of the conventional MR sensor 10. Furthermore, the MR effect decreases for thinner conventional CoFe sensor layers 18. Thus, the signal from the conventional MR sensor 10 is reduced. As a result, a conventional MR sensor 10 may be unusable at lower thicknesses of the conventional CoFe sensor layer 18.

Accordingly, what is needed is a system and method for improving the ability of MR sensors to function for higher density recording applications and, therefore, at smaller thicknesses of the sensor layer. The present invention addresses such a need.

SUMMARY OF THE INVENTION

The present invention provides a method and system for providing a magnetoresistive sensor and a read head that includes the magnetoresistive sensor. The method and system comprise providing a pinned layer, a nonmagnetic spacer layer and a composite sensor layer. The pinned layer has a first magnetization that is pinned in a particular direction. The nonmagnetic spacer layer resides between the composite sensor layer and the pinned layer. The composite sensor layer includes a CoFe layer and a composite layer adjacent to the CoFe layer. The composite layer includes CoFe and at least one of Ta, Hf, Ti, Nb, Zr, Au, Ag, Cu, B, C, $O_2$, $H_2$ and $N_2$.

According to the system and method disclosed herein, the present invention provides a magnetoresistive sensor having improved performance for smaller thicknesses of the CoFe layer in the composite sensor layer.

DETAILED DESCRIPTION OF THE INVENTION

The present invention relates to an improvement in read heads. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 1:
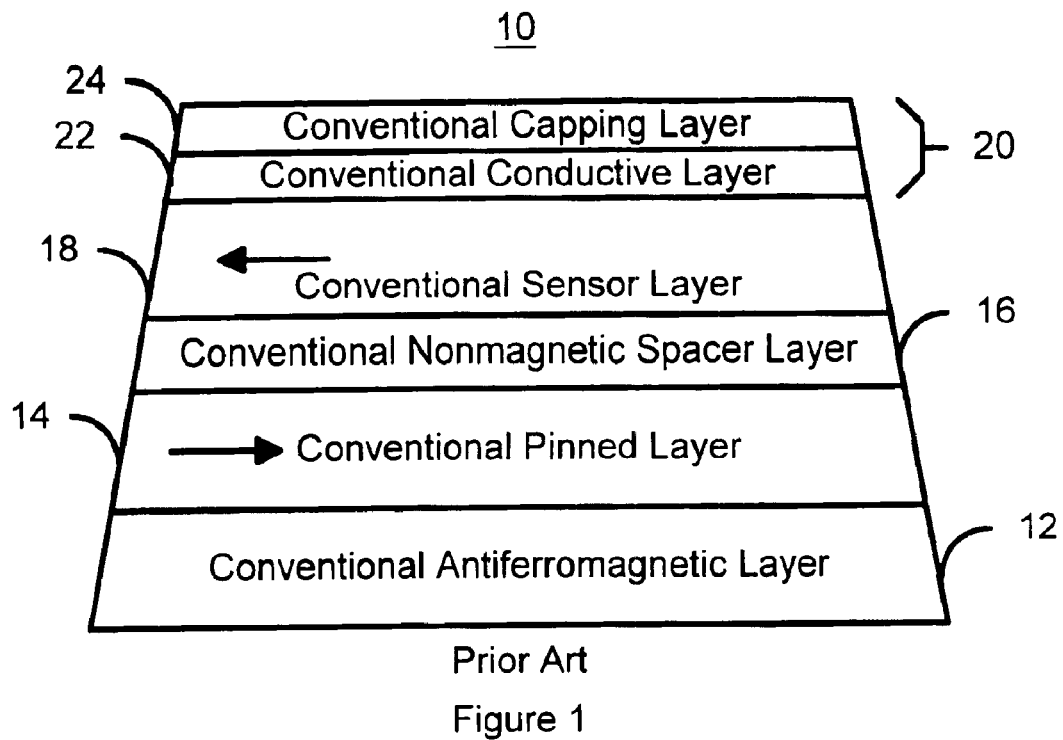
FIG. 1 is a diagram of a conventional magnetoresistive sensor.
Figure 2:
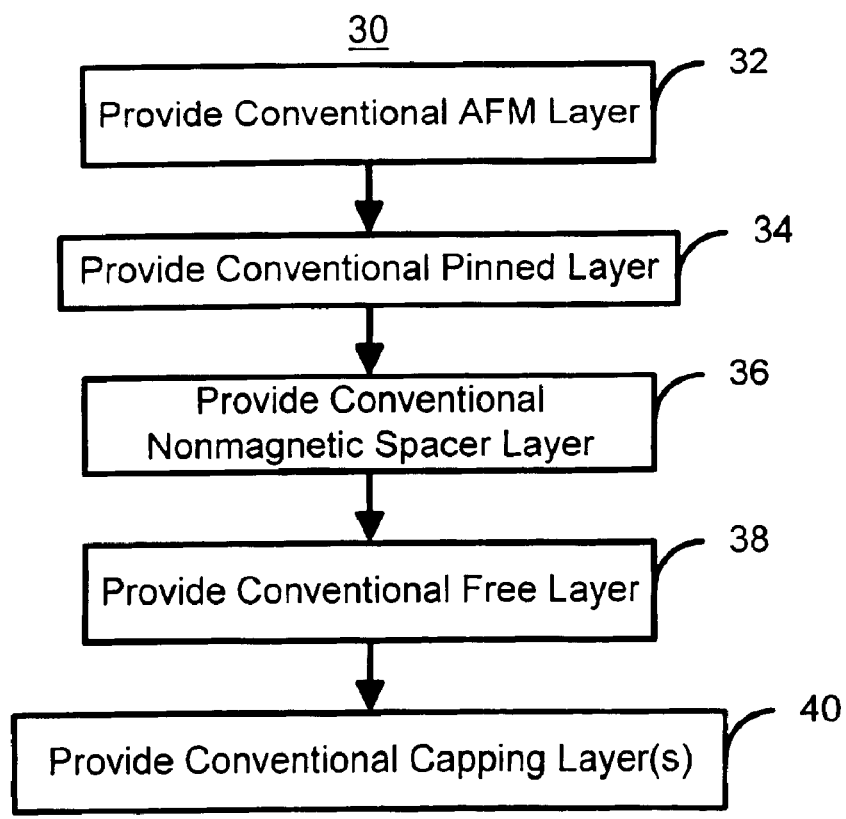
FIG. 2 is a flow chart depicting a conventional method for providing a conventional magnetoresistive sensor.

Currently, MR heads are widely used in magnetic recording technology. In conventional MR heads, a conventional MR sensor is used. Such a conventional MR sensor 10 is depicted in FIG. 1. The conventional MR sensor 10 includes a conventional sensor layer 18 that is composed of CoFe. In addition, the current trend in magnetic recording technology is toward the use of thinner sensor layers 18 that can be used to detect lower signals from high-density recording media. However, one of ordinary skill in the art will readily realize that the performance of the conventional CoFe sensor layer 18, and thus the conventional MR sensor 10, dramatically degrades for low thicknesses of the conventional CoFe sensor layer 18. Consequently, the conventional MR sensor 10 may not function for high density recording applications.

The present invention provides a method and system for providing a read head. The method and system comprise providing a shield, a read sensor and an insulating read gap disposed between the shield and the read sensor. In one aspect, the insulating read gap includes at least one oxidized metal layer substantially free of pinholes. In another aspect, the insulating read gap includes at least one bilayer including a first insulating layer having a first insulator and a second insulating layer having a second insulator different from the first insulator.

The present invention will be described in terms of a particular read head having certain components and particular materials. However, one of ordinary skill in the art will readily recognize that this method and system will operate effectively for other heads, other components and other materials. For example, the present invention is preferably used in a merged head including a read head and a write head. In addition, the read head in which the present invention is used could include other sensors and other materials. The present invention is also described in the context of certain methods having particular steps for providing the read sensor and head. However, one of ordinary skill in the art will readily recognize that the present invention is consistent with the use of other methods having different and/or additional steps.

Figure 3A:
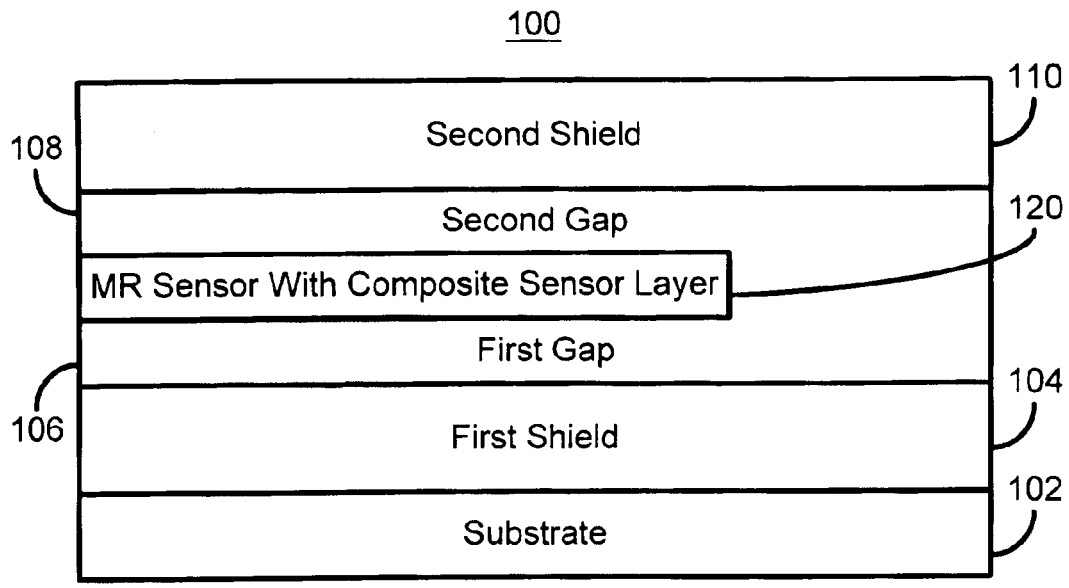
FIG. 3A is a diagram of one embodiment of a magnetoresistive head in accordance with the present invention.

To more particularly illustrate the method and system in accordance with the present invention, refer now to FIG. 3A, depicting one embodiment of a read head 100 in accordance with the present invention. The read head 100 is preferably incorporated into a merged head that includes the read head 100 and a write head (not shown). The read head 100 is preferably built upon a substrate 102 and includes a first shield 104, a first gap 106, an MR sensor 120 in accordance with the present invention, a second gap 108 and a second shield 110. The shields 104 and 110 are preferably conductive and are used to shield the MR sensor 120 from the magnetic field generated by bits (not shown) which are not currently being read. The gaps 104 and 106 are preferably nonmagnetic insulators.

Figure 3B:
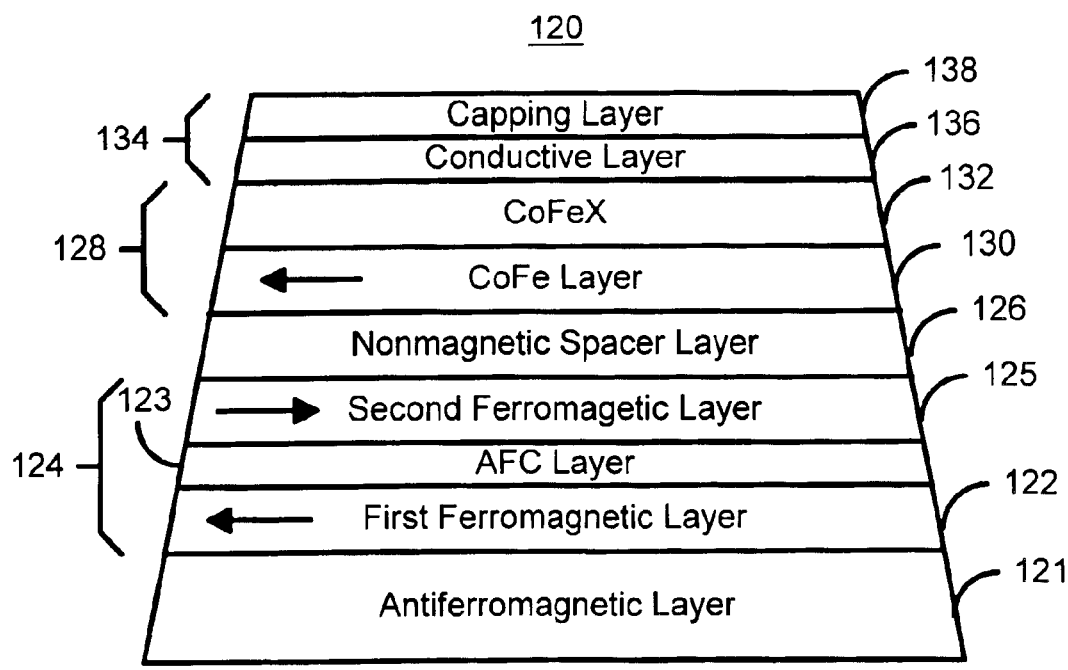
FIG. 3B is a diagram of one embodiment of a magnetoresistive sensor in accordance with the present invention.

FIG. 3B is a diagram of one embodiment of a MR sensor 120 in accordance with the present invention, as used in the MR head 100. The MR sensor 120 includes an antiferromagnetic layer 121, a pinned layer 124, a nonmagnetic spacer layer 126, a composite sensor layer 128 and a capping layer 134. The pinned layer 124 depicted is a synthetic pinned layer including ferromagnetic layers 122 and 125 separated by an AFC layer 123. The AFC layer 123 is preferably nonmagnetic, conductive and has a thickness that allows the magnetizations of the magnetic layers 122 and 125 to be antiferromagnetically coupled. Note that although the pinned layer 124 is depicted as being a particular synthetic pinned layer, nothing the prevents the method and system from being used with a simple or other pinned layer (not shown). The capping layer 134 preferably includes an oxygen containing copper conductive layer 136 and a TaO capping layer 138. In addition, the nonmagnetic spacer layer 126 is preferably composed of Cu. The CoFe/Cu interface between the sensor layer 128 and the nonmagnetic spacer layer 126 is preferably treated with a surfactant by exposing the Cu spacer layer 126 to a trace amount of oxygen, as discussed below.

The composite sensor layer 128 includes two layers 130 and 132. The first layer 130 is a CoFe layer 130. The second layer 132 is a composite layer 132. The composite layer 132 includes a combination of Co and another material. Thus, the composite layer 132 is a CoFeX layer. X represents Ta, Hf, Ti, Nb, Zr, Au, Ag, Cu, B, C, $O_2$, $H_2$, $N_2$ or a combination of two or more thereof. In a preferred embodiment, the thickness of the CoFe layer 132 is less than or equal to twenty Angstroms. Because the CoFe layer can have the smaller, desired thickness of between zero and twenty Angstroms, the CoFe layer 132 is used to sense the external magnetic field generated by a magnetic recording media (not shown). Also in a preferred embodiment, the thickness of the composite layer 134 is less than or equal to twenty Angstroms.

The composite layer 132 preferably has a higher resistivity than the CoFe layer 130, has a positive magnetostriction, lower magnetization and less effect of enhancing the MR ratio. The higher resistivity of the composite layer 134 ensures that less current passing through the MR sensor 120 is shunted away from the CoFe layer 130. In addition, the lower magnetization of the composite layer 132 the product of the magnetization and the layer thickness can be sustained while decreasing the net moment of the composite sensor layer 128. Furthermore, the total thickness of the composite sensor layer 128 (the thickness of the CoFe layer 130 and the composite layer 132) is larger, even though the net moment of the composite sensor layer 128 is reduced. Consequently, sufficient room for spin dependent scattering to occur in the composite sensor layer 128 is provided. As a result, the magnetoresistance of the composite sensor layer 128 is enhanced. This enhancement is particularly noticeable for lower thicknesses, such as less than fifteen Angstroms, of the CoFe layer 130. Because the composite layer 132 has a positive magnetostriction, the magnetostriction of the CoFe layer 130 can be counteracted to a certain extent. In addition, the specific composition of the composite layer 132, the element(s) chosen for X in the CoFe X, can be selected to improve the thermal stability and/or the reliability of the composite sensor 120. In addition, the anisotropy and coercivity of the composite sensor layer 128 are reduced over that of a conventional sensor layer including only CoFe.

Thus, using the composite sensor layer 128, including the CoFe layer 130 and the composite layer 132, the magnetic properties of the composite sensor layer 128 do not substantially degrade, even at lower thicknesses of the composite sensor layer. The soft magnetic properties of the composite sensor layer 128 are thus retained even at lower thicknesses. As a result, the composite sensor layer 128 is capable of being used with high-density recording media, which generate a smaller external field. In addition, the magnetostriction of the MR sensor 120 is reduced. The MR sensor 120 can, therefore, be more easily biased. Furthermore, the magnetoresistance ratio of the MR sensor 120 remains high, even at lower thicknesses of the MR sensor 120.

For example, Table 1 depicts the resistivity and magnetic properties of the composite sensor layer 128. The quantities in Table 1 were measured for single films that are two hundred Angstroms in thickness. As can be seen in Table 1, the resistivity increases and the magnetization decreases when a composite layer 132 is introduced. Thus, as discussed above, the composite layer 132 can reduce the net magnetization of the composite sensor layer 128 without substantially shunting current away from the CoFe layer 130. The desired magnetization and resistivity can be achieved by selecting the desired material(s) for X in the CoFeX composite layer 132.

TABLE 1

| CoFeX (atomic %) | Structure | Resistivity ($\mu\Omega$cm) | Magnetization (normalized) |
|---|---|---|---|
| X = 0 | fcc | 17.57 | 1.00 |
| X = $Ti_1Cu_2$ | fcc | 23.43 | .91 |
| X = $B_5$ | fcc | 50.93 | .82 |
| X = $Ta_5$ | fcc | 115.56 | .64 |

In addition, the magnetic properties of the sensor layer can be improved. Table 2 depicts the magnetic properties of conventional MR sensors, such as the conventional MR sensor 10, as well as an MR sensor 120 in accordance with the present invention. As can be seen in Table 2, the total resistance of the composite sensor layer 120 is reduced. In addition the magnetoresistance is improved in the composite sensor layer 120 by increasing the layer thickness. In addition, the shunting of current to other layers, such as the capping layer 134, is reduced because of the larger resistivity of the composite layer 132. In addition, the use of the CoFeX composite layer 132 in proximity to the capping layer 134 may be seen as stop layers for charge carriers that travel to the conductive layer 136 and then top specular layers. Thus, the magnetoresistance ratio is improved. Furthermore, the response to the small external magnetic fields and soft magnetic properties are improved. In addition, the magnetostriction is also greatly reduced. Thus, performance of the composite MR sensor 120 is greatly improved.

Figure 4A:
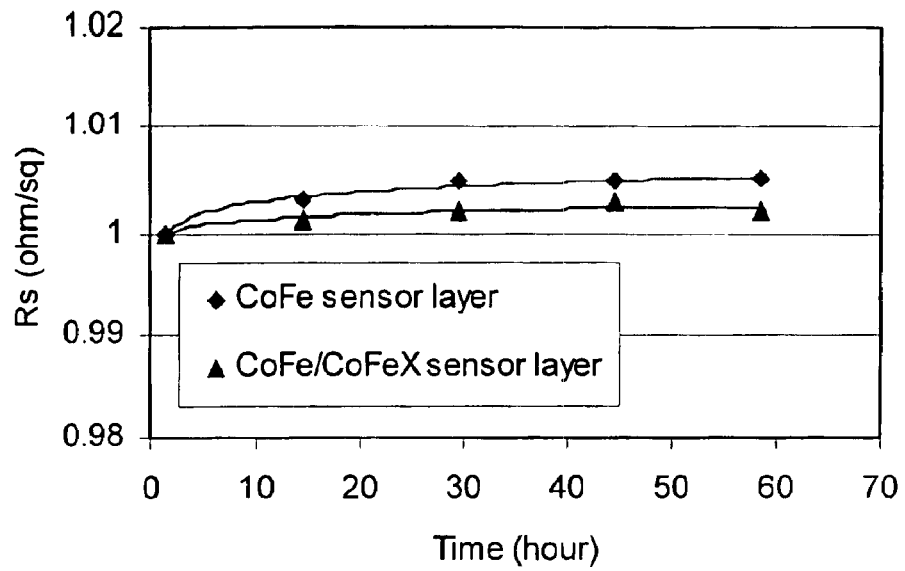
FIGS. 4A and 4B are graphs depicting thermal stability of one embodiment of a magnetoresistive sensor in accordance with the present invention.
Figure 4B:
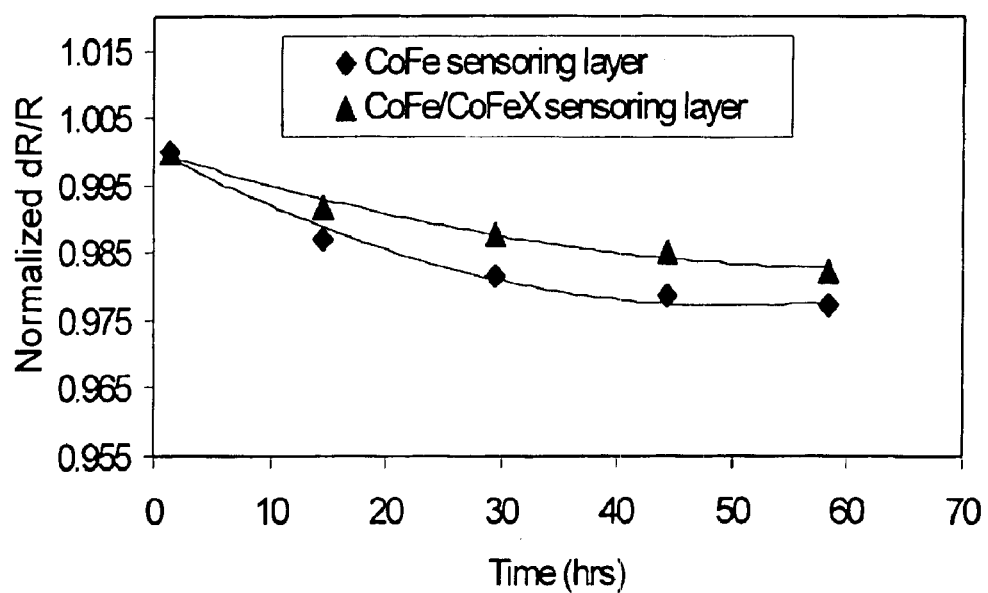

In addition, the thermal stability of the composite MR sensor 120 is also improved. FIGS. 4A and 4B are graphs 160 and 170 depicting thermal stability of one embodiment of a magnetoresistive sensor in accordance with the present invention. The graph 160 depicts the variation of Rs with time for a conventional CoFe sensor layer 18 as well as a composite sensor 128 including a CoFe layer 130 and a CoFeX layer 132. Similarly, the graph 170 depicts the magnetoresistance ratio ($\Delta R/R$) versus time for a conventional CoFe sensor layer 18 as well as a composite sensor 128 including a CoFe layer 130 and a CoFeX layer 132. The sample for the conventional MR sensor 10 had the form: Si/Ta(20)/NiFeCr(50)/PtMn(150)/CoFe(20)/Ru(8.5)/CoFe(22)/Cu(18–22)/St/CoFe(13)/Cu(2–15)/TaO(10), where the numbers in parentheses are the thickness in Angstroms. The sample for the MR sensor 120 having a composite sensor layer 128 has the thirteen Angstrom CoFe layer replaced by a composite sensor layer 128 including a CoFe layer 130 and a CoFeX layer 132. As can be seen in the graphs 160 and 170, there is less variation with temperature for the composite sensor 128 including a CoFe layer 130 and a CoFeX composite layer 132. Thus, in addition to having improved magnetic properties, the MR sensor can be more thermally stable.

Figure 5:
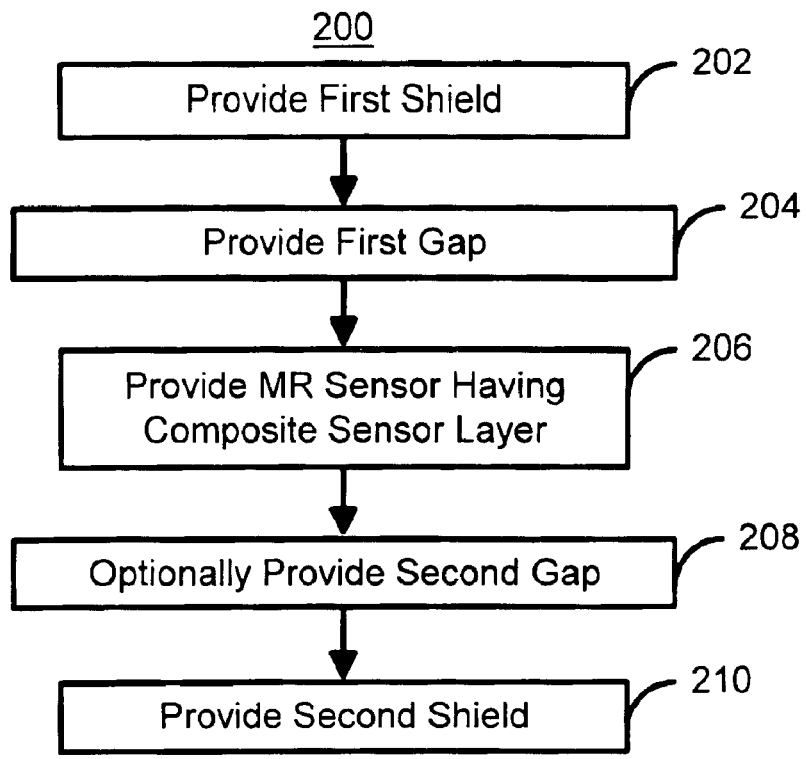
FIG. 5 is a flow chart depicting one embodiment of a method in accordance with the present invention for providing a magnetoresistive head.

FIG. 5 is a high-level flow chart depicting one embodiment of a method 200 in accordance with the present invention for providing a MR head. The method 200 is preferably used in fabricating the MR head 100. Thus, the method 200 is described in the context of the MR head 100 and the MR sensor 120 depicted in FIGS. 3A and 3B. A first shield 104 and a first gap 106 are provided, via steps 202 and 204, respectively. The MR sensor 120 having a composite sensor layer 128 is provided, via step 206. Step 206 thus includes providing a CoFe layer 130 and a CoFeX layer 132, each of which is preferably less than twenty Angstroms in thickness. The second gap 108 is provided, via step 208. The second shield 110 is also provided, via step 210.

Figure 6:
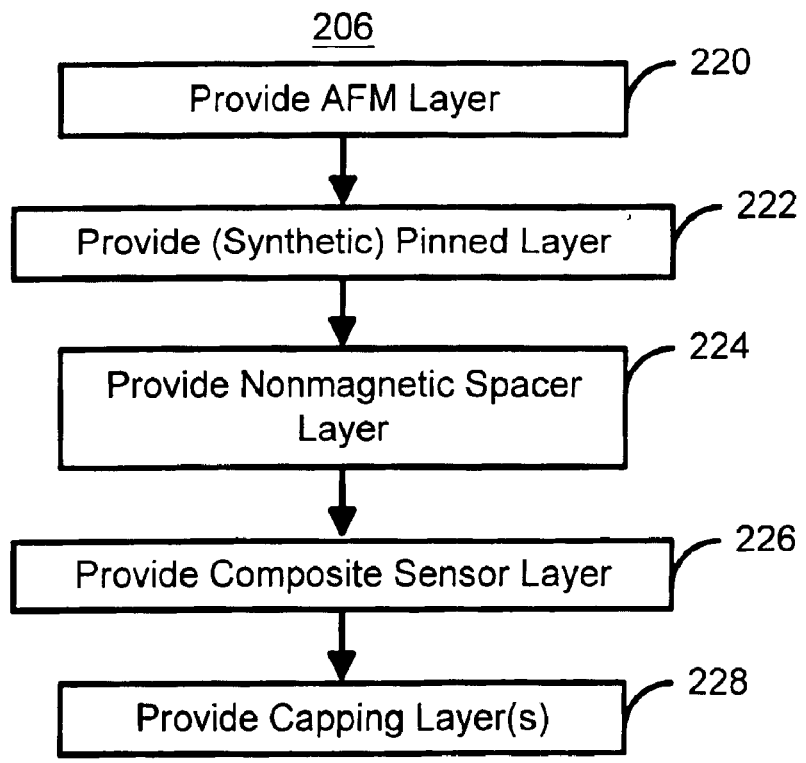
FIG. 6 is a flow chart depicting one embodiment of a method in accordance with the present invention for providing a magnetoresistive sensor.

FIG. 6 is a more detailed flow chart depicting one embodiment of a method for performing step 206 in accordance with the present invention for providing a magnetoresistive sensor 120 having a composite sensor layer. The method 206 is preferably used in fabricating the MR head 100. Thus, the method 206 is described in the context of the MR head 100 and the MR sensor 120 depicted in FIGS. 3A and 3B. The AFM layer 122 is provided, via step 220. In a preferred embodiment, the AFM layer 122 may include PtMn. The pinned layer 124 is provided, via step 222. In a preferred embodiment, step 222 includes providing two ferromagnetic layers 122 and 125 separated by an AFC layer 123. The ferromagnetic layers 122 and 125 are antiferromagnetically coupled. Thus, step 222 preferably provides a synthetic pinned layer. However, in an alternate embodiment, step 222 can be used to provide a simple or other pinned layer. The nonmagnetic spacer layer 126, which is preferably copper, is provided, via step 224. Also in step 224, the copper spacer layer is preferably treated by providing a trace of oxygen, preferably on the order of $10^{-4}$ mT, after deposition so that the CoFe/Cu interfaces are treated with a surfactant. The composite sensor layer 128 is

TABLE 2

| Sensor Layer (thickness, in magnetic moment equivalence) | Rs ($\Omega$/sq) | Magneto-Resistance (%) | Sens. (%/Oe) | Hint (Oe) | Hcf (Oe) | Hk (Oe) | $\lambda$ ($10^{-7}$ cm) |
|---|---|---|---|---|---|---|---|
| CoFe(13) | 21.2 | 13.7 | 1.13 | 2.73 | 3.77 | 8.44 | −17.8 |
| CoFe(11)/CoFeB(4) | 19.2 | 14.9 | 1.31 | 11.57 | 3.67 | 8.84 | 4.86 |
| CoFe(11)/CoFeTiCu(4) | 19.5 | 15.0 | 1.40 | 12.85 | 2.77 | 7.53 | −3.23 |
| CoFe(11)/CoFeTa(4) | 20.1 | 14.4 | 1.59 | 22.4 | 2.16 | 8.06 | −7.97 |
| CoFe(11)/COFeN(4) | 19.5 | 14.9 | 1.60 | 12.71 | 3.11 | 7.67 | −3.50 | provided, via step 226. Step 226 thus includes providing a CoFe layer 130 that is preferably less than or equal to twenty Angstroms in thickness and a CoFeX layer 132 that is preferably less than twenty Angstroms in thickness. The capping layer 134 is then provided, via step 228. Step 228 preferably includes providing the oxygen containing conductive layer 136 and a TaO layer 138. The the conductive layer 136 preferably includes a copper layer that contains a trace of oxygen diffused into through a thin TaO top layer 138 after deposition. The TaO layer 138 is then provided on the conductive layer 136.

Using the methods 200 and 206 a MR head 100 and MR sensor 120 having a composite sensor layer 128 can be provided. The composite sensor layer 128 includes a CoFe layer 130 and a CoFeX layer 132. Use of the composite sensor can improve the soft magnetic properties of the MR sensor 120, enhance the magnetoresistance ratio and improve magnetostriction. Thus, performance of the MR sensor 120 and the MR head 100 are improved.

A method and system has been disclosed for providing a read head having an improved magnetoresistive sensor. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A magnetoresistive sensor comprising:
    a pinned layer having a first magnetization, the first magnetization being pinned in a particular direction;
    a nonmagnetic spacer layer; and
    a composite sensor layer, the composite sensor layer having a CoFe layer and a composite layer immediately adjacent to the CoFe layer, the composite layer including CoFe and at least one of Ta, Hf, Ti, Nb, Zr, Au, Ag, Cu, B, C, $O_2$, $H_2$ and $N_2$, the nonmagnetic spacer layer residing between the composite sensor layer and the pinned layer.

2. The magnetoresistive sensor of claim 1 further comprising a magnetostriction control layer adjacent to the composite sensor layer.

3. The magnetoresistive sensor of claim 2 wherein the magnetostriction control layer further includes an oxygen containing layer of copper and a TaO layer.

4. The magnetoresistive sensor of claim 1 further comprising:
    an antiferromagnetic layer adjacent to the pinned layer, the antiferromagnetic layer for pinning the first magnetization of the pinned layer.

5. The magnetoresistive sensor of claim 1 wherein the pinned layer is a synthetic pinned layer.

6. The magnetoresistive sensor of claim 1 wherein the composite layer has a thickness of no more than twenty Angstroms.

7. The magnetoresistive sensor of claim 1 wherein the CoFe layer is less then twenty Angstroms in thickness.

8. The magnetoresistive sensor of claim 1 wherein the nonmagnetic spacer layer includes copper and wherein the nonmagnetic spacer layer is treated with oxygen.

9. A read head comprising:
    a shield;
    an insulating read gap; and
    a magnetoresistive sensor, the magnetoresistive sensor including a pinned layer, a nonmagnetic spacer layer and a composite sensor layer, the pinned layer having a first magnetization that is pinned in a particular direction, the nonmagnetic spacer layer residing between the composite sensor layer and the pinned layer, the composite sensor layer having a CoFe layer and a composite layer immediately adjacent to the CoFe layer, the composite layer including CoFe and at least one of Ta, Hf, Ti, Nb, Zr, Au, Ag, Cu, B, C, $O_2$, $H_2$ and $N_2$, the nonmagnetic spacer layer residing between the composite sensor layer and the pinned layer.

10. A method for providing magnetoresistive sensor comprising the steps:
    (a) providing a pinned layer having a first magnetization, the first magnetization being pinned in a particular direction;
    (b) providing a nonmagnetic spacer layer; and
    (c) providing a composite sensor layer such that the nonmagnetic spacer layer resides between the composite sensor layer and the pinned layer, the composite sensor layer having a CoFe layer and a composite layer immediately adjacent to the CoFe layer, the composite layer including CoFe and at least one of Ta, Hf, Ti, Nb, Zr, Au, Ag, Cu, B, C, $O_2$, $H_2$ and $N_2$.

11. The method of claim 10 further comprising the step of:
    (d) providing a magnetostriction control layer adjacent to the composite sensor layer.

12. The method of claim 11 wherein the step of providing magnetostriction control layer (d) further includes the step of:
    (d1) providing an oxygen containing layer of copper and a TaO layer.

13. The method of claim 10 further comprising the step of:
    (d) providing an antiferromagnetic layer adjacent to the pinned layer, the antiferromagnetic layer for pinning the first magnetization of the pinned layer.

14. The method of claim 10 wherein the pinned layer providing step (a) further includes the step of:
    (a1) providing a synthetic pinned layer.

15. The method of claim 10 wherein the composite layer has a thickness of no more than twenty Angstroms.

16. The method of claim 10 wherein the CoFe layer is less then twenty Angstroms in thickness.

17. The method of claim 10 wherein the nonmagnetic spacer layer includes copper and wherein the nonmagnetic spacer layer is treated with oxygen.

18. A method for providing a read head comprising the steps:
    (a) providing a shield;
    (b) providing an insulating read gap; and
    (c) providing a magnetoresistive sensor, the magnetoresistive sensor including a pinned layer, a nonmagnetic spacer layer and a composite sensor layer, the pinned layer having a first magnetization that is pinned in a particular direction, the nonmagnetic spacer layer residing between the composite sensor layer and the pinned layer, the composite sensor layer having a CoFe layer and a composite layer immediately adjacent to the CoFe layer, the composite layer including CoFe and at least one of Ta, Hf, Ti, Nb, Zr, Au, Ag, Cu, B, C, $O_2$, $H_2$ and $N_2$, the nonmagnetic spacer layer residing between the composite sensor layer and the pinned layer.

* * * * *